(12) United States Patent
Breuer et al.

(10) Patent No.: US 10,904,731 B2
(45) Date of Patent: Jan. 26, 2021

(54) METHOD FOR REMOTE PROVISIONING OF A USER EQUIPMENT IN A CELLULAR NETWORK

(71) Applicants: Gemalto M2M GmbH, Munich (DE); GEMALTO SA, Meudon (FR)

(72) Inventors: Volker Breuer, Boetzow (DE); Lars Wehmeier, Falkensee (DE); Anne-Marie Praden, Gemenos (FR)

(73) Assignees: THALES DIS FRANCE SA, Meudon (FR); THALES DIS AIS DEUTSCHLAND GMBH, Munich (DE)

( * ) Notice: Subject to any disclaimer, the term of this patent is extended or adjusted under 35 U.S.C. 154(b) by 5 days.

(21) Appl. No.: 16/312,606

(22) PCT Filed: Jun. 14, 2017

(86) PCT No.: PCT/EP2017/064489
§ 371 (c)(1),
(2) Date: Dec. 21, 2018

(87) PCT Pub. No.: WO2018/001728
PCT Pub. Date: Jan. 4, 2018

(65) Prior Publication Data
US 2020/0107173 A1    Apr. 2, 2020

(30) Foreign Application Priority Data

Jul. 1, 2016 (EP) .................................... 16305834

(51) Int. Cl.
*H04W 48/12* (2009.01)
*H04W 4/70* (2018.01)
(Continued)

(52) U.S. Cl.
CPC ............... *H04W 4/70* (2018.02); *H04W 4/50* (2018.02); *H04W 12/0023* (2019.01);
(Continued)

(58) Field of Classification Search
CPC ......... H04W 48/12; H04W 4/70; H04W 4/08; H04W 12/06; H04W 24/02; H04W 72/12; H04W 74/04
(Continued)

(56) References Cited

U.S. PATENT DOCUMENTS 8,825,009 B2 * 9/2014 Breuer .................. H04W 12/06
                                                    455/411
9,160,735 B2 * 10/2015 Keith, Jr. ................ H04L 63/10
(Continued)

FOREIGN PATENT DOCUMENTS

EP    2996355 A1    3/2016

OTHER PUBLICATIONS

International Search Report (PCT/ISA/210) dated Jul. 13, 2017, by the European Patent Office as the International Searching Authority for International Application No. PCT/EP2017/064489.
(Continued)

*Primary Examiner* — William D Cumming
(74) *Attorney, Agent, or Firm* — Buchanan Ingersoll & Rooney PC

(57) ABSTRACT

A system and method for transmitting a provisioning dataset from a cellular network to a user equipment. The cellular network includes a plurality of base nodes providing access to the user equipment, a remote provisioning server accessible by the cellular network, and a core network, including at least two network slices. At least one of the network slices includes at least one network node exclusively assigned to the network slice. At least one of the network slices is dedicated for operating a predefined class of user equipment.
(Continued)

At least one remote provisioning network slice includes an assigned network node giving access to the remote provisioning server, and at least one base node assigned to the remote provisioning network slice.

19 Claims, 2 Drawing Sheets

(51) Int. Cl.
    *H04W 24/02*    (2009.01)
    *H04W 72/12*    (2009.01)
    *H04W 74/02*    (2009.01)
    *H04W 12/06*    (2009.01)
    *H04W 4/50*     (2018.01)
    *H04W 12/00*    (2009.01)
    *H04W 84/04*    (2009.01)
    *H04W 88/02*    (2009.01)

(52) U.S. Cl.
    CPC .......... *H04W 12/06* (2013.01); *H04W 84/042* (2013.01); *H04W 88/02* (2013.01)

(58) Field of Classification Search
    USPC ................................................. 455/410, 411
    See application file for complete search history.

(56) References Cited

U.S. PATENT DOCUMENTS

| | | | |
|---|---|---|---|
| 9,392,397 B2 * | 7/2016 | Schultz | H04W 72/12 |
| 9,785,912 B2 * | 10/2017 | Quezada | G06Q 10/087 |
| 9,877,140 B2 * | 1/2018 | Breuer | H04W 74/04 |
| 10,185,928 B2 * | 1/2019 | Quezada | G06Q 10/087 |
| 10,263,726 B2 * | 4/2019 | Breuer | H04W 24/02 |
| 10,368,221 B2 * | 7/2019 | Breuer | H04W 4/70 |
| 10,448,316 B2 * | 10/2019 | Breuer | H04W 48/12 |
| 2014/0304791 A1 * | 10/2014 | Keith, Jr. | H04L 47/27 726/7 |
| 2016/0314431 A1 * | 10/2016 | Quezada | G06Q 10/087 |
| 2018/0032950 A1 * | 2/2018 | Quezada | G06Q 30/0222 |
| 2020/0107173 A1 * | 4/2020 | Breuer | H04L 63/0876 |

OTHER PUBLICATIONS

Written Opinion (PCT/ISA/237) dated Jul. 13, 2017, by the European Patent Office as the International Searching Authority for International Application No. PCT/EP2017/064489.

* cited by examiner

METHOD FOR REMOTE PROVISIONING OF A USER EQUIPMENT IN A CELLULAR NETWORK

FIELD OF THE INVENTION

The present invention relates to a method for remote provisioning of a user equipment in a cellular network.

The invention also pertains to a cellular network using said method. The invention further relates to a base node of the cellular network. Further the invention pertains to a user equipment for operating in said cellular network.

BACKGROUND OF THE INVENTION

In the field of wireless communication it is by now common practice to equip a user equipment, in particular a mobile handset, which is supposed to operate in a designated cellular network from a known network operator, with a user identification card, in particular a SIM card or UICC, plug it in and start using the mobile handset.

This works fine as long as a person has one or only a few handsets. In the case of a plurality of user equipments this procedure is getting more complicated. This holds in particular true for machine-type-communication (MTC) devices, where a fleet of devices is supposed to be placed somewhere in the field and each MTC device shall work in cellular networks. For those user equipments it would be preferable, if the network subscription could be prepared in the factory.

Meanwhile the concept of remote provisioning was introduced, which provides that a user equipment attaches to a base node of a cellular network and requests for the full authentication credentials. This is in particular applicable with regards to a change of the subscription, e.g. in case of roaming, or when an alternative connection (e.g. via landline internet or via separate provisioning equipment) is available.

Still an issue is the problem of security of the first access when no valid authentication credentials are available at the time of the first bringing into service. Valid authentication credentials are in particular those that are defined in the 3GPP standardization for the respective technology standard. Should a user equipment without such full 3GPP compliant authentication credentials access the cellular network, this would pose a severe security leak, which could attract attackers to access the network with fraudulent intentions.

In particular for the coming technology standard following today's LTE resp. 4G technology—this coming technology standard is usually known as 5G—this topic could gain additional traction, as this standard is dedicated to support different types of user equipment besides mobile handsets and has a much more device-centric approach. Hence, remote provisioning of user equipment without full 3GPP compliant authentication credentials will get more the rule than the exception for MTC devices.

It is therefore the goal of present invention to propose a solution for a secure initial remote provisioning of the user equipment supposed to operate in cellular networks, in particular those following the 5G technology standard, with less manual efforts.

Further alternative and advantageous solutions would, accordingly, be desirable in the art.

SUMMARY OF THE INVENTION

For this it is according to a first aspect of the invention suggested a method to for transmitting a provisioning dataset according to claim 1. It is further suggested according to a second aspect of the invention a cellular network for wireless communication according to claim 6. It is further proposed according to a third aspect of the invention a user equipment for operating in a cellular network according to claim 14.

In a first aspect of the invention it is proposed a method for transmitting a provisioning dataset from a remote provisioning server accessible by a cellular network, said cellular network comprising a plurality of base nodes providing access to user equipments, and a core network, comprising at least two network slices, at least one of the network slices comprising at least one network node exclusively assigned to the network slice, wherein at least one of the network slices is dedicated for operating a predefined class of user equipments, and at least one remote provisioning network slice is comprising an assigned network node giving access to the remote provisioning server, and at least one base node being assigned to the remote provisioning network slice, the method comprising the steps of:

receiving at said base node from a user equipment an attach request comprising an initial device identifier as authentication credentials, said initial device identifier being different from the authentication credentials to be used for attaching to a base node assigned to a network slice different from the remote provisioning network slice, receiving at said base node a remote provisioning request from said user equipment, forwarding said remote provisioning request by means of the remote provisioning network slice to the remote provisioning server, responding to the user equipment with a provisioning dataset received from the remote provisioning server, in case a user equipment identifier matching to the initial device identifier is accessible for the remote provisioning server.

The invention is based on the concept of the coming cellular technology standard 5G, where network slices are introduced in the network architecture. The network slices are virtual or real hardware layers dedicated for a certain task and organized distinct from the other device, in order to reduce impact of traffic load on other network slices.

According to that the core network of a cellular network supporting 5G comprises at least two network slices. Preferably there are network slices dedicated for certain types of user equipment resp. devices or terminals, in particular mobile handsets, massive MTC, low bandwidth MTC and ultra high reliable MTC devices. But there are also approaches which designate such network slices for other purposes than only reserve a certain device type.

As such MTC user equipments are getting more widespread, the organization of deployment in particular with regards to the subscriptions of the user equipment is getting more complex with a growing number of user equipments.

The inventive method therefore is dedicated to carry out a remote provisioning of authentication credentials for accessing the cellular network on user equipments that have no other connection available.

Therefore it is suggested that the core network comprises a remote provisioning network slice. Such remote provisioning network slice comprises a plurality of network nodes that are exclusively dedicated to this network slice, that means not shared with other network slices.

In particular an access point to a remote provisioning server is preferably exclusive for the remote provisioning network slice. This access point is a network node that provides access to the remote provisioning server, no matter where the remote provisioning server is located. As it may be that a remote provisioning server is serving various cellular networks in a country or even various countries, hence the remote provisioning server is in those cases not part of the cellular network, and consequently not part of a network slice.

In a more simple approach, when the remote provisioning server is incorporated in the core network of a cellular network, it is however advantageous to place also the remote provisioning server in the remote provisioning network slice. This organization is transparent for the RAN (radio access network), as long as one access point of the remote provisioning network slice is available.

Additionally the remote provisioning network slice is characterized in that it has assigned a plurality of base nodes. Such base nodes, which form the RAN interface to the served user equipments, are then allowed to retrieve remote provisioning requests and provide a direct link to the remote provisioning network slice. Additionally there are other base nodes of the cellular network that are not assigned to the remote provisioning network slice. This approach increases the stability, security and integrity of the network.

The base nodes assigned to the remote provisioning network slice are preferably also connected to at least one other network slice, in order to serve the (majority) of provisioned user equipments.

A base node that is assigned to a remote provisioning network slice is in particular qualified by a special capability, as it allows camping of user equipments without full 3GPP compliant authentication credentials. This is useful as the user equipments requesting a remote provisioning as a matter of fact have not yet got authentication credentials. Nonetheless there is a need for security measures in order not to allow each and any user equipment to attach to the base nodes and hence carry out a denial of service or other type of attack.

Therefore the method starts with the base node receiving an attach request from a user equipment without a valid subscription. Such attach request comprises an initial device identifier instead of regular authentication credentials. Other authentication credentials are preferably not part of the attach request.

Such the initial device identifier is different from 3GPP compliant authentication credentials, which are used for attaching to base nodes that are assigned to network slices different from the remote provisioning network slice. That means, with these initial device identifier a user equipment would not be accepted for doing normal service.

The initial device identifier is in particular deployed in the user equipment already in the factory and stored in a secure memory of the user equipment. The deployed initial device identifiers are exchanged from factory with an authority which assures that corresponding identifiers are added to the provisioning database accessible for the remote provisioning server.

Preferably the base node carries out security checks with the initial device identifier. A simple approach is to check the format of the initial device identifier. Another approach would be to check with other network nodes, like MME, HSS/HLR or similar network nodes resp. servers that will be designed for 5G compliant networks. This would mean, that the provisioning database is also synchronized with the cellular networks HLR databases. This approach increases security but also latency and organizational efforts.

In any case the inventive method is transparent to additional security measures, when a user equipment sends an attach request comprising an initial device identifier.

The base node which received the attach request sends after successfully checking the initial device identifier a response indicating the approval message to the attach request. Preferably this approval message includes additional information for the user equipment that are useful for the remote provisioning request which is expected afterwards.

This includes in particular network resources, like RACH (random access channel) resources for the remote provisioning request, and/or an address of the remote provisioning server. The RACH procedure was introduced in LTE for initial access of a user equipment to a base node, using special allocated uplink resources.

In a particular embodiment the attach request already includes the remote provisioning request and is only handled when the attach request is approved by the base node.

Consequently the base node, in particular in response to the approval message, receives a remote provisioning request from said user equipment.

The user equipment is allowed to attach only for doing remote provisioning, that means all other requests would not be handled.

When receiving the remote provisioning request at the base node, it is forwarded directly to the remote provisioning network slice and from there to the remote provisioning server. This is advantageous as by doing so all other cellular network resources, in particular network slices, are not affected, neither in terms of load nor in terms of integrity.

The remote provisioning request also comprises the initial device identifier.

At the remote provisioning server after receiving the forwarded remote provisioning request it is then checked if a matching user equipment identifier is found in the accessible provisioning database.

If so, the remote provisioning server creates and forwards a provisioning dataset comprising regular authentication credentials complementing to the then activated subscription of the cellular network.

This provisioning dataset is forwarded through the remote provisioning network slice to the base node, which responds to the user equipments remote provisioning request with the provisioning dataset.

Preferably the method further comprises the step of receiving a message from the user equipment indicating successful processing of the provided provisioning dataset, and forwarding said message to the remote provisioning server for deactivating the stored user equipment identifier in the remote provisioning server.

With that the user equipment indicates to the cellular network that it successfully installed the provisioning dataset and also activated the subscription on the device side. Consequently the remote provisioning server can deactivate or delete the user equipment identifier matching to the initial device identifier, in order to prevent another user equipment to request again a remote provisioning with the same initial device identifier.

On the other hand in case the remote provisioning failed, there is a need to allow a retry for the user equipment. This is advantageous as otherwise a one-time failure would require major manual interaction.

In an advanced embodiment it is suggested that the attachment with the user equipment is terminated after successfully provisioning the user equipment with the provisioning dataset.

This embodiment assures that the base node after successfully provisioning does not continue to be attached to the base node by way of a limited camping, which was only allowed for remote provisioning. Instead the normal cell selection method shall apply. Therefore the attachment is terminated and the user equipment shall attach anew, now with the received regular authentication credentials.

It is in particular possible, that the user equipment attaches to the same base node or to another. This is due to the fact that not all base nodes are capable of handling remote provisioning requests, that means are assigned to the remote provisioning network slice of the cellular network.

Therefore the user equipment initially might not have tried to attach to the base node from where the strongest radio signals are retrieved, as it is according to normal cell selection procedures. After being fully provisioned, this limitation does not hold, and the cell selection follows the regular process which is supposed to select the strongest receivable cell.

It is proposed in another preferred embodiment for the base node assigned to the remote provisioning network slice, the step of broadcasting an information element indicating the capability of supporting remote provisioning.

Such broadcasting from a remote provisioning capable base node is in particular carried out as part of the system information, e.g. SIBs. The information element tells a user equipment with is willing to attach to a base node for remote provisioning, that a) the cellular network of the base node is capable of performing a remote provisioning and b) that the base node is ready to do so.

Hence the user equipment can attach to this base node and continue with the procedure for remote provisioning.

In another preferred embodiment it is proposed that at least one second base node is only assigned to at least one network slice different from the remote provisioning network slice, comprising for the second base node the step of broadcasting an information element indicating to another base node capable of supporting remote provisioning.

This embodiment relates to base nodes of said cellular network who are not capable of remote provisioning. This is due to the fact that they are not assigned to the remote provisioning network slice, but to at least one other only.

In order to speed up the attach process for the user equipment, the base node broadcasts an information element indicating which at least one base node in the proximity is capable of carrying out remote provisioning. This tells the user equipment that a) the cellular network of the base node is capable of performing a remote provisioning and b) to which base node the user equipment can attach for carrying out the remote provisioning.

It becomes clear that the inventive method and its embodiments fulfill the envisaged target and allow a remote provisioning method for user equipments placed in the field without any other connection means.

According to a second aspect of the invention it is proposed a cellular network for wireless communication, comprising a plurality of base nodes and at least two network slices, at least one of the network slices comprising at least one network node exclusively assigned to the network slice, wherein at least one of the network slices is dedicated for operating a predefined class of user equipment, and at least one remote provisioning network slice includes an assigned network node giving access to a remote provisioning server, and at least one base node is assigned to the remote provisioning network slice, wherein upon accepting at said assigned base node a remote provisioning request from a user equipment, said remote provisioning request comprising an initial device identifier, the cellular network is configured to forward the remote provisioning request to the remote provisioning server by means of the remote provisioning network slice, respond by means of said base node to the user equipment with a provisioning dataset received from the remote provisioning server, in case a user equipment identifier stored in the remote provisioning server is matching the initial device identifier.

This aspect shares the advantages of the first aspect.

The cellular network comprises at least a core network composed of a plurality of network slices and a radio access network (RAN) comprising a plurality of base nodes. A plurality of network nodes, in particular servers, routers, hubs, are fully or partly reserved to network slices. At least one slice is dedicated for remote provisioning, which is the remote provisioning network slice. A subset of base nodes are assigned to the remote provisioning network slice, that is directly connected without affecting other network slices. Other network slices map to certain air resources or device types.

The base nodes, in particular eNodeBs, are the RAN entry points. A base node comprises communication circuitry for wirelessly transmitting data packages and receiving circuitry. Typically both circuitry is implemented in a transceiver which is configured to manage both operations. Circuitry for wirelessly transmitting and receiving circuitry are both connected to an antenna and typically provide further elements, at least processing circuitry for handling requests and controlling the communication circuitry.

Preferably the remote provisioning request is a RACH request comprising an indication indicating that said RACH request is directed to remote provisioning. In particular the RACH request is carried out on RACH resources that are indicated by the base node to the user equipment in response to an attach request resp. by way of broadcast. When the RACH request uses such RACH resources, the cellular network knows that the remote provisioning network slice is to be used for handling the request.

Preferably the access from the remote provisioning network slice to entities outside of the remote provisioning network slice and the assigned base nodes is restricted to the remote provisioning server.

With that embodiment it is assured that no access outside of the remote provisioning network slice is possible, that is only the RPS can be accessed. Such clear distinction is needed as requests from user equipments which are not fully eligible according to the authentication credentials have access to the remote provisioning network slice, but in case of a fraud attack no other parts of the cellular network shall be affected.

Preferably the remote provisioning network slice only comprises control plane (CP) network nodes, but no user plane (UP) network nodes. The latter would allow access to remote servers, in particular the internet, and is preferably suppressed in this network slice.

According to a preferred embodiment it is proposed that remote provisioning network slice comprises at least one network node that is shared between said cellular network and at least one other cellular network, and the remote provisioning server is accessible for both cellular networks by means of said network node.

With this embodiment it is foreseen to share a remote provisioning server between cellular networks from different operators. This simplifies the handling for all parties, as only one RPS needs to be maintained. This embodiment may also be implemented by way of different remote provisioning servers which access a common remote provisioning database, at least a database comprising the user equipment identifiers in order to find out the eligibility of a requesting user equipment. With common database architecture techniques like replication, shadowing and load balancing such approach is possible to carry out without improper delays.

As part of the cellular network according to the second aspect of the invention there are foreseen two types of base nodes.

According to a first embodiment a base node of the cellular network, wherein the base node is configured to access the remote provisioning network slice for provisioning user equipments, and to operate user equipments requesting access with an initial device identifier, further configured to broadcast an information element, said information element comprising an indication about whether the base node is capable of supporting remote provisioning.

Preferably these base nodes that are capable of remote provisioning shall provide a wide area coverage, in order to assure that user equipments, in particular stationary ones, from all the network coverage area can perform a remote provisioning procedure.

According to a second embodiment a base node of the cellular network configured to broadcast an information element comprising an indication indicating to a second base node capable of supporting remote provisioning, in case said base node is not capable of supporting remote provisioning.

The first base node is capable of supporting remote provisioning, the second is not. Hence the first base node is assigned to the remote provisioning network slice and consequently broadcasts information elements indicating this situation.

The second base node therefore broadcasts information relating to the inability of carrying out a remote provisioning, preferably by means of sending an indication which base node is capable of remote provisioning.

In both cases the information elements are preferably broadcasted as part for the system information elements, in particular the system information elements dedicated to user equipments requesting for authentication credentials.

In another preferred embodiment it is proposed that the base node is further configured to broadcast with system information block a provisioning barring indication, indicating that user equipments requesting for a remote provisioning request are barred from accessing the cellular network.

With this embodiment the cellular network is capable of securing its stability by means of—at least temporary—keeping user equipments out of the cellular network, that do not have yet regular 3GPP authentication credentials.

With an indication, preferably as part of the system information elements being part of the SIBs, a barring of such user equipments is announced to potentially requesting user equipments. Further the base nodes do not accept attach requests from such user equipments which might be received despite the barring indication.

In times of high traffic or integrity resp. stability issues this embodiment allows the cellular network to keep the network clear of user equipment which are not fully qualified as known, subscribed users, and which consequently have a lower priority in terms of being served.

Preferably this barring is a timewise barring, comprising an indication when such barring is terminated. This is advantageous for a cellular network to allow remote provisioning of such MTC devices only in the night. Then the barring would be broadcasted during the day, indicating, that e.g. starting from 1 a.m. remote provisioning is possible again.

According to a third aspect of the invention it is proposed a user equipment for operating in a cellular network according to the second aspect of the invention, comprising a memory, where an initial device identifier is stored, said initial device identifier being different from authentication credentials for unrestricted access to base nodes of the cellular network, the user equipment further comprising a secure memory element for storing authentication credentials, the user equipment is configured to:

receive at least one broadcasted information element from a base node of the cellular network, in case said information element indicates the capability of supporting remote provisioning, attach to said base node and send a remote provisioning request comprising said initial device identifier, upon reception of a provisioning dataset from the base node, install in said secure memory authentication credentials derived from said provisioning dataset.

This aspect of the invention shares the advantages of the previous aspects. It relates to the user equipment side, for a user equipment which is not yet provisioned with regular 3GPP authentication credentials. It covers how such a user equipment interacts with the cellular networks according to the second aspect.

The user equipment is in particular a terminal device with processing circuitry, memory and transmitting circuitry for wirelessly transmitting data packages and receiving circuitry. Typically both circuitry is implemented in a transceiver which is configured to manage both operations. Circuitry for wirelessly transmitting and receiving circuitry are both connected to an antenna and typically provide further elements. Such circuitry is controlled by the at least one processing circuitry. The transmitting and receiving circuitry, in particular a base band chip, high frequency radio and at least one antenna, is configured to communicate with a base node of a cellular network.

The user equipment provides a secured memory where it is capable to deploy subscription information from a received provisioning datasets. Such secured memory is in particular a UICC, either removable or fixed. Other types of secured memory are also possible. Further the user equipment has stored, either in another memory or in said secured memory, the initial device identifier. This is preferably carried out in the factory, like it is the case for the IMEI.

First the user equipment after switching on scans the supported frequency bands for finding signals from base nodes in the proximity. The found base nodes above a certain signal strength value are collected and analyzed in order of descending signal strength.

The user equipment is configured to decode broadcasted information elements from the identified base nodes it is supposed to operate with, after synchronizing with the base node. In response to that broadcast reception, the user equipment preferably tries to attach to a base node, when the base node fulfills certain criteria, in particular support of the appropriate technology.

Preferably the user equipment is configured in case the received information element indicates a second base node capable of supporting remote provisioning, to attach to said second base node.

In particular when the strongest receivable base node is not capable of supporting remote provisioning, the user equipment can in response to such broadcasted information element simply select a base node which is capable, even if it is not the strongest base node.

In another preferred embodiment the user equipment is further configured in case said received information element indicates the non-availability of remote provisioning capability to blacklist said cellular network for remote provisioning and to search for a base node of another cellular network.

For the case that a base node is part of a cellular network that does not support remote provisioning at all, it is also foreseen to submit as part of the system information broadcast an indication about this situation.

When the user equipment synchronizes with this base node and receives such information element, it knows that base nodes of this cellular network will not be helpful for remoter provisioning and can therefore be blacklisted. That simplifies the further procedure of finding an appropriate base node for getting provisioned.

After successfully attaching to a base node capable of remote provisioning, the user equipments sends a remote provisioning request comprising the initial device identifier. Preferably the remote provisioning request is sent on RACH resources indicated by the base node in response to the attach request.

When the remote provisioning request is successful, the user equipment receives a provisioning dataset and installs in said secure memory the authentication credentials being delivered with the provisioning dataset. Such authentication credentials comprise in particular an IMSI, a MSISDN and/or encryption keys.

Preferably after successful installation the initial device identifier stored in the user equipment is deleted resp. deactivated. Further a message is sent to the base node indicating the successful installation for allowing the remote provisioning server to deactivate the stored complementing user equipment identifier.

Advantageously the user equipment is further configured to terminate the attachment after successfully installing authentication credentials, and to attach to a base node of the cellular network being assigned to a network slice different from the remote provisioning network slice by means of said authentication credentials.

As it can be seen the base node for regular operation may differ from the base node selected for remote provisioning, as not only the base node with the best signal strength is selected, but the base node needs to be capable of supporting the remote provisioning.

As it is shown this invention advantageously solves the depicted problem and offers a reliable solution for deploying a plurality of user equipments in the field which can care for getting successfully provisioned by themselves. The network architecture suggested for this purpose fits smoothly in the anyhow envisaged network architecture concept of 5G and supports a secure and reliable operation of the cellular network although user equipments without 3GPP authentication credentials are supposed to be served.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a cellular network 1 of the type to which the present invention is applied as an embodiment. The cellular network is a network for wireless communication according to the advancing 5G standard. Generally a cellular network consists of a core network part comprising a couple of network nodes 5,7 and a radio access network (RAN) part comprising RAN entry points 4 like base stations, nodeBs resp eNodeBs, and some network components like MME etc. that control the RAN entry points. In the following such RAN entry points are for simplicity reasons addressed as base nodes 4, without limiting the scope. The base nodes form the air interface for the user equipments 3, that is the wireless devices that are supposed to operate in the cellular network and to perform communication tasks like voice calls, data connections etc.

Figure 1:
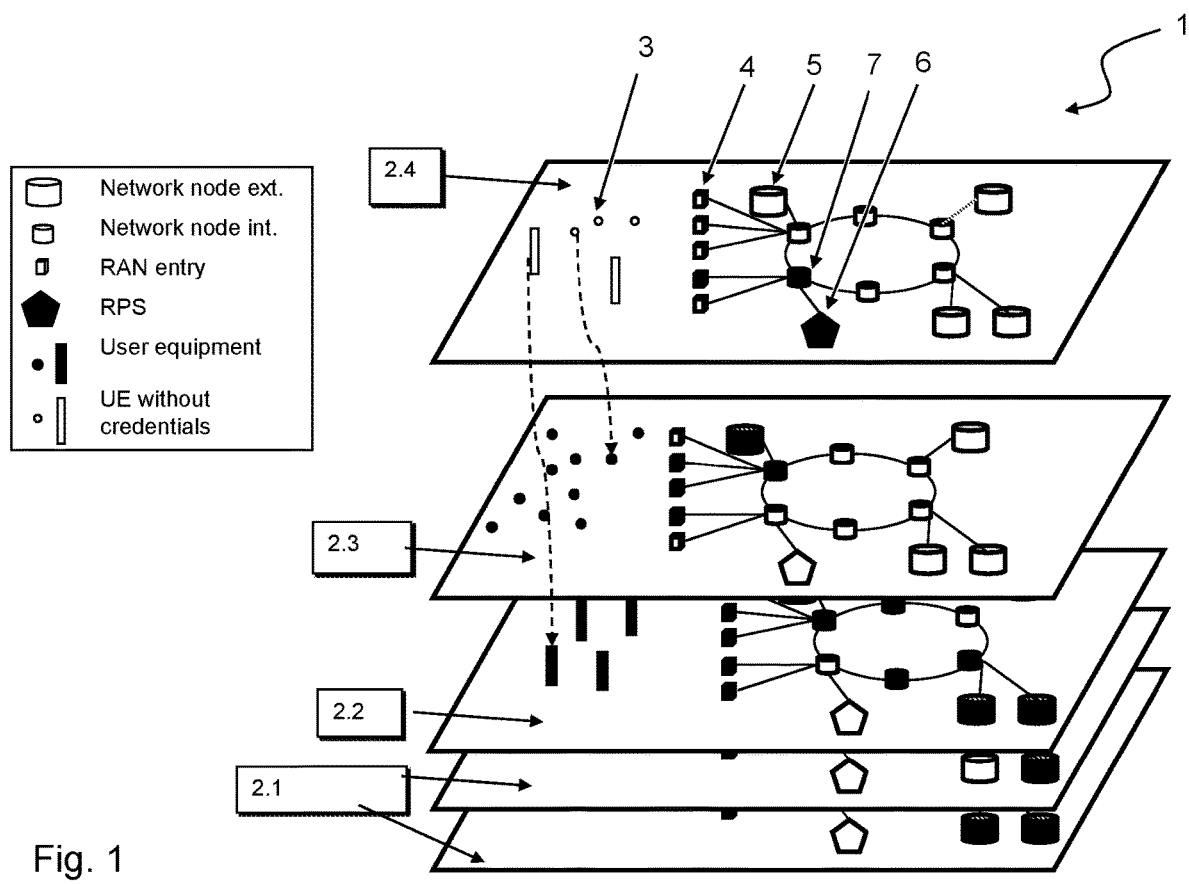
FIG. 1 represents a schematic of the cellular network of the type to which the present invention is applied as an embodiment.

With the advance of 5G a new concept of the network organisation was introduced which is based on network slices 2. Such network slices are virtual or real network component layers dedicated for a certain task, in particular for serving certain types of user equipments 3 and/or certain services. That concept is foreseen to separate parts of the cellular network and allow to equip them that way, that they are best fit for the purpose they shall fulfil.

In the example there are shown two network slices 2.1 for general purpose access, additionally there is a network slice 2.2 for use equipments with high reliability requirements, and there is a network slice 2.3 for massive machine-type communication (MTC) devices. It is obvious that normal mobile handsets have other requirements towards a cellular network than a high reliability device or a MTC device, in particular a stationary one.

Therefore some of the network components, in particular base node 4, internal network nodes 7 and external network nodes 5 are dedicated to just one network slice, some of which are shared between them. Further the interfaces between the network slices are clearly defined and can be limited. This layout allows for each kind of network slice a different structure without impacting the other network slices.

According to the invention the cellular network has one additional network slice, which is the remote provisioning network slice 2.4. This remote provisioning network slice 2.4 has the task for different types of user equipments to allow for carrying out a remote provisioning.

Remote provisioning is the procedure with that a user equipment during operation with a cellular network gets—in particular over the air—downloaded authentication credentials for accessing the cellular network.

The user equipment would then update the subscriber identity module (SIM) card or UICC (Universal Integrated Circuit Card) or any other secure memory in the user equipment which is dedicated to securely hold the authentication credentials assigned by the network operator.

Generally it is the problem for a user equipment which was put in the field without valid authentication credentials to use the cellular network for remote provisioning. The reason is, that it would be a security leak, if user equipment could without valid authentication credentials could access the cellular network.

For that purpose it is now introduced the remote provisioning network slice 2.4. This network slice is qualified compared to the other network slices by at least to peculiarities:

- the network slice has access to a remote provisioning server 6 (RPS);
- the network slice has assigned base nodes 4 that allow access from user equipments without full valid 3GPP compliant authentication credentials.

The remote provisioning network slice 2.4 is hence the network slice that is accessed by a user equipment for getting valid authentication credentials. Typically it will be the first slice for being accessed by the user equipments.

The base node 4 that is assigned to the remote provisioning network slice broadcasts information elements indicating, that it is capable of providing a remote provisioning service to a user equipment 3 that attaches to the base node. Preferably such information element is provided with the system information blocks (SIBs).

If a base node 4 is not assigned to the remote provisioning network slice 2.4, then preferably the base node broadcasts with the SIBs another indication informing the user equipment about the inability to provide remote provisioning service.

After receiving the broadcast from a base node with the indication that the user equipment can provide the remote provisioning service, the user equipment which seeks for provisioning attaches to the designated base node.

Here the behaviour of the user equipment derives from the normal behaviour of a pre-provisioned user equipment. Normally the base node with the best suitability criteria would be selected for attaching. Now it is first checked, if the base node provides the necessary remote provisioning service, or in other words, is assigned to the remote provisioning network slice.

This attach procedure comprises that the user equipment provides its initial device identifier. This initial device identifier is in particular stored in a memory of the user equipment.

The base node 4 then checks the validity of the initial device identifier, by itself or with access to other network nodes like MME, HSS etc.

After successfully attaching to the base node 4, the user equipment 3 is only allowed to carry out one service request, which is the remote provisioning request.

Preferably the remote provisioning capable base node 4 provided the user equipment with an indication about the way of sending a RPS request. This means in particular that certain designated RACH resources are used for remote provisioning requests. Such indication is preferably done with the broadcast of the SIBs or with the response to the attach request.

By using the designated RACH resources the base node directly knows that the request from the user equipment 3 is a remote provisioning request, and it is to be forwarded to the remote provisioning network slice. This is advantageous as without big analysing tasks of network components, the remote provisioning request will not affect other network slices.

Consequently the remote provisioning request is forwarded to the remote provisioning server 6 by means of network components 7, belonging to the control plane.

The affected network components are in particular exclusively assigned to the remote provisioning network slice. Therefore any impact on other network slices resp. components is prevented.

The remote provisioning server 6 is shown in present embodiment as part of the remote provisioning network slice 2.4. This is not necessarily the case, it could also be positioned outside of the cellular network 1, and could even be used by other operator's cellular networks. At least in this case the internal network component 7 which provides access to the RPS would be an exclusive part of the remote provisioning network slice 2.4.

When the remote provisioning server 6 receives the remote provisioning request, it preferably checks the provided initial device identifier with a provisioning database accessible for the RPS. It is preferred that the RPS holds its provisioning database, but also shared databases may be preferable.

The RPS needs to find a user equipment identifier matching to the initial device identifier, and in that case provides a provisioning dataset comprising full 3GPP compliant authentication credentials for download to the user equipment.

Preferably two symmetric keys are used between RPS and the user equipment for checking the eligibility of getting valid authentication credentials. In the most straightforward embodiment the initial device identifier and the user equipment identifier fully complement.

The download is preferably carried out as it is known for remote provisioning, the user equipment consequently receives the provisioning dataset and installs the subscription in its UICC or otherwise secured memory, and thus activates the new subscription.

When this is carried out, the user equipment preferably sends an indication about successful processing of the provisioning dataset to the base node, which forwards this message to the RPS. Finally the user equipment identifier accessible for the RPS is then deleted resp. deactivated in order to assure that no other user equipment with the same matching initial device identifier can carry out a remote provisioning.

For safeguarding transaction security a first blocking of the user equipment identifier is carried out, after sending the provisioning dataset. This blocking may be released, when the user equipment sends a NACK message, which informs about not successful activation.

In that case, the RPS would need to inform the cellular network about the invalidity of the transmitted provisioning dataset. Preferably this provisioning dataset, in particular the included IMSI, is discarded.

Further the user equipment preferably deletes resp. deactivates the initial device identifier as well, when the provisioning was successful.

Following this successful provisioning, the user equipment loses its attachment to the base node and would now need to attach again to a base node according to normal suitability criteria, and by means of the downloaded authentication credentials.

It may be the case that the user equipment attaches to the same base node 4 as before, provided that the base node is capable of accessing other network slices than the remote provisioning network slice. As it is shown in the figure, the user equipment after provisioning is shown as filled circle or box (indicating different types of devices), and would then (dashed arrow) be handled from different network slices 2.2, 2.3, with respective base nodes 4 assigned to these network slices.

Figure 2:
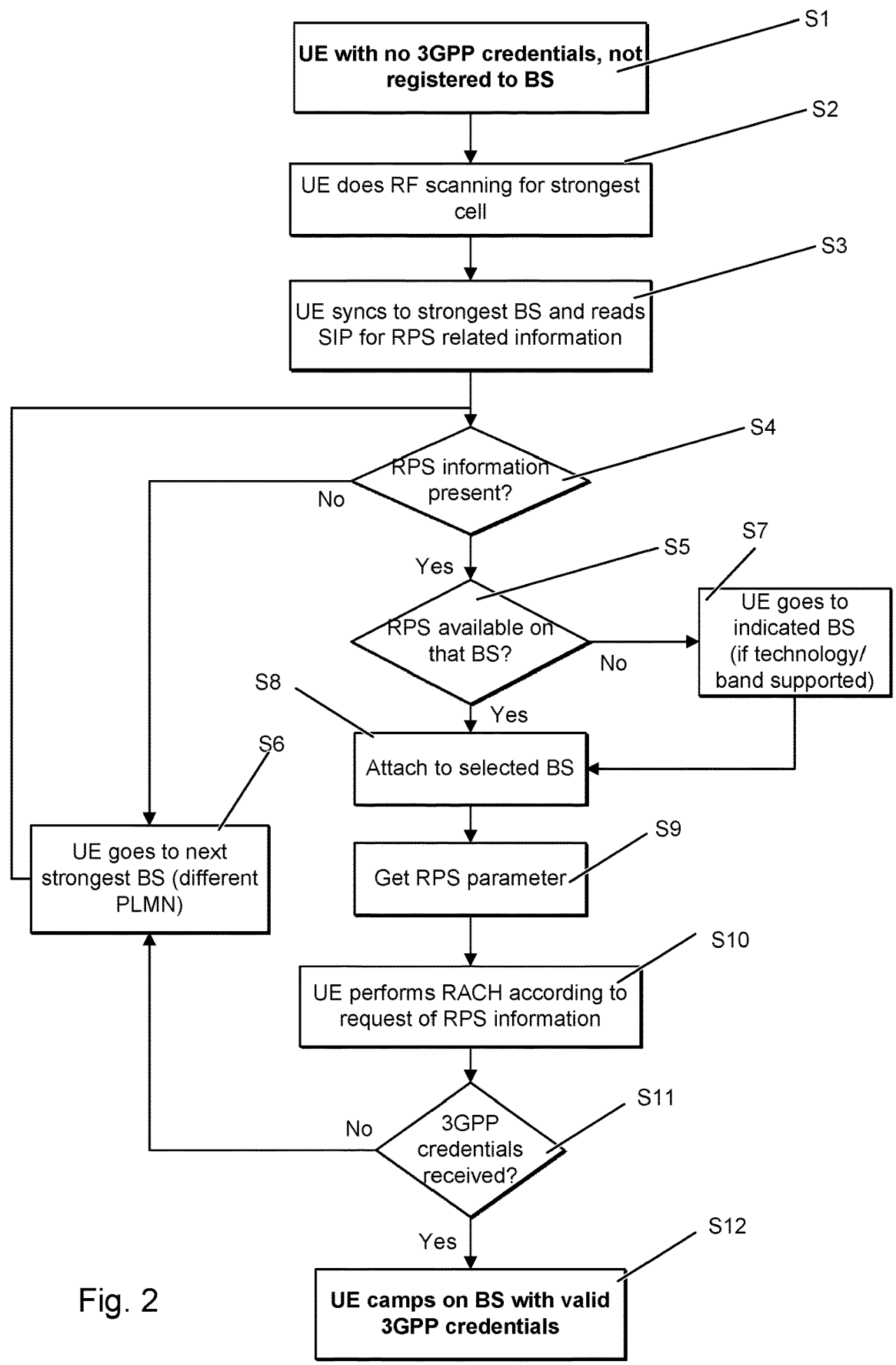
FIG. 2 shows a flow chart of an exemplary embodiment of the inventive method.

The detailed process flow from the perspective of the user equipment is shown in an exemplary embodiment in FIG. 2.

It starts in step S1 with a user equipment (UE) put in the field without 3GPP authentication credentials. Such a user equipment is generally not eligible to register to a cellular network for carrying out any service.

In any case the user equipment needs to figure out if there are any base nodes of a technology standard supported by the user equipment is around. For doing so it carries out in step S2 a radio frequency (RF) scanning on the frequency areas it can address, in order to find cells resp. signals of base nodes. The result of this step is typically a list of found base nodes with an indication about the strength of received signals and/or any other indicator depicting the quality of service with this base node.

According to the standard the normal way is to synchronize with the strongest base node first. Therefore in step S3 the user equipment synchronizes with the base node with the best signal strength, and reads the system information broadcasted by the base node. For this purpose it is not necessary to attach to the base node. The system information includes among others information relating to the network operator etc. According to an embodiment of this invention the information element comprises also an indication about the capability to carry out a remote provisioning. This information includes two parts: first that the cellular network the base node belongs to is capable of remote provisioning and second if the current base node is the right base node for doing so. Preferably both information are coded in separate information elements.

Consequently the user equipment checks in step S4 if such remote provisioning indication of the cellular network is present in the broadcasted system information of the currently synchronized base node.

If this is not the case, the process flow branches to step S6, where from the list created in step S2 the next strongest base node is selected and the operation returns to step S4. Preferably this selection affects a base node from another cellular network. If such information is not available, the process continues between steps S4 and S6 until a base node of another cellular network which supports remote provisioning is found.

If that is the case, the process flow branches to step S5. Here it is now checked if the base node is capable of accepting a remote provisioning request, that means that the base node is assigned to the remote provisioning network slice of the cellular network it belongs to.

According to a preferred embodiment of the invention a base node of a cellular network supporting remote provisioning broadcasts in any case one of two information: either that the base node itself is capable of remote provisioning, or an indication about a base node nearby which is capable of remote provisioning.

Which of these information is found for the current base node is checked in step S5. In case the base node is capable itself, the process flow branches to step S8, otherwise it branches to step S7.

In step S7 the user equipment follows the recommendation of the current base node's broadcasts and synchronizes with the indicated base node. In this case the list of base nodes from step S2 is not taken into account anymore. This step provides that the technology and band(s) of the base node is supported by the user equipment, which might in particular be an issue for low cost user equipments supporting only low bandwidth. Should this not work out here, the procedure step would need to proceed in step S6 (not shown).

Here the user equipment is capable of synchronizing with the base node and thus has finally found a base node capable of carrying out a remote provisioning. Consequently the process flow branches back to step S8 as well.

Step S8 assumes that the user equipment successfully identified a base node that is capable for carrying out remote provisioning. Hence, the user equipment attaches to the selected base node.

This is a special situation as this is an attach operation without common 3GPP authentication credentials, which are not available in the user equipment yet. Hence, the user equipment provides an initial device identifier, it received upfront, e.g. in the factory, and the base node has capabilities to check, if such initial device identifier is eligible to access the cellular network. This is preferably done by checking with other network nodes, like MME, HSS (or network nodes in 5G with comparable functions) if the initial device identifier is allowed. A more simple solution would be to check the format of the initial device identifier for this purpose, and the eligibility of the initial device identifier is then checked in the remote provisioning server.

Preferably as a response from the base node the user equipment receives in step S9 the parameter for doing a remote provisioning. These RPS parameter in particular include an address of the remote provisioning server (RPS) and/or air interface resources, in particular RACH resources which are dedicated for the RPS request from the user equipment.

Hence the user equipment is in the position to start the remote provisioning, which is done in step S10 with a RPS request by using the assigned RACH resources from the previous step. The RPS request at least comprises the initial device identifier.

The base node consequently accepts this request and knows, as the user equipment is attached with an initial device identifier and uses the dedicated RACH resources, that the request may only be forwarded to the assigned remote provisioning network slice. There the RPS is addressed, and checks in the locally available provisioning database if a matching user equipment identifier is available. In the simplest case this is equal or at least comprises the initial device identifier.

If a matching user equipment identifier is found, the RPS creates a provisioning dataset with regular 3GPP authentication credentials representing a subscription in the cellular network. This provisioning dataset is returned via the remote provisioning network slice and the base node to the user equipment.

If no matching user equipment identifier is found, a message is returned indicating a not acknowledge of the remote provisioning.

On user equipment side it is therefore checked in step S11 if the remote provisioning was successful, which means, if valid 3GPP authentication credentials were retrieved with the provisioning dataset. If so, this provisioning dataset is installed in the local secured memory, in particular an UICC, MIM or other secured memory.

If the RPS sends a NACK, the base node would preferably inform the user equipment with a respective message and then end the attach operation. The user equipment would then have to branch to step S6 again and find another base node from another cellular network in order to continue with finding a remote provisioning opportunity.

Otherwise the user equipment branches to step S12 and also ends the current attach operation, in order to attach again to this or another appropriate base node of a cellular network depicted in the installed authentication credentials. Now the user equipment is fully operational with the cellular network and depending upon the type of user equipment and/or service it will be assigned to another network slice different from the remote provisioning network slice.

This process flow has shown from the perspective of the user equipment, how the invention solves the situation of a user equipment without full credentials to receive a remote provisioning, by maintaining the stability of the cellular network.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for transmitting a provisioning dataset from a cellular network to a user equipment, said cellular network comprising a plurality of base nodes providing access to the user equipment, a remote provisioning server accessible by the cellular network, and a core network, comprising at least two network slices, at least one of the network slices comprising at least one network node exclusively assigned to the network slice,
wherein at least one of the network slices is dedicated for operating a predefined class of user equipment, and at least one remote provisioning network slice comprises an assigned network node giving access to the remote provisioning server, and a base node being assigned to the remote provisioning network slice,
the method comprising the steps of:
receiving, by said base node and from the user equipment an attach request comprising an initial device identifier as authentication credentials, said initial device identifier being different from the authentication credentials to be used for attaching to a different base node assigned to a network slice different from the remote provisioning network slice,
determining, by said base node, whether the initial device identifier is eligible to access the cellular network;
in response to determining that the initial device identifier is eligible to access the cellular network, sending, by the base node and to the user equipment, a parameter for remote provisioning;
after sending the parameter for remote provisioning, receiving, by said base node and from the user equipment, a remote provisioning request carried out using the parameter,
forwarding, by said base node, to the remote provisioning server, and via the remote provisioning network slice, said remote provisioning request,
responding to the user equipment with a provisioning dataset received from the remote provisioning server, in case a user equipment identifier matching to the initial device identifier is accessible for the remote provisioning server.

2. Method according to claim 1,
comprising for the base node assigned to the remote provisioning network slice, the step of broadcasting an information element indicating the capability of supporting remote provisioning.

3. Method according to claim 2,
wherein at least one second base node is only assigned to at least one network slice different from the remote provisioning network slice,
comprising for the second base node the step of broadcasting a different information element indicating to another base node capable of supporting remote provisioning.

4. Method according to claim 1,
further comprising the step of receiving a message from the user equipment indicating successful processing of the provided provisioning dataset,
forwarding said message to the remote provisioning server for deactivating a stored user equipment identifier in the remote provisioning server.

5. Method according to claim 1,
wherein the attachment with the user equipment is terminated after successfully provisioning the user equipment with the provisioning dataset.

6. A system comprising:
a cellular network for wireless communication, comprising:
a plurality of base nodes providing access to a user equipment, and at least two network slices, at least one of the network slices comprising at least one network node exclusively assigned to the network slice,
wherein at least one of the network slices is dedicated for operating a predefined class of user equipment, and at least one remote provisioning network slice includes an assigned network node giving access to a remote provisioning server, and a base node is assigned to the remote provisioning network slice,
wherein the base node is configured to, in response to receiving an attach request comprising an initial device identifier from the user equipment and determining that the initial device identifier is eligible to access the cellular network, send a parameter for remote provisioning to the user equipment,
wherein upon accepting at said base node a remote provisioning request from the user equipment, said remote provisioning request comprising the initial device identifier, the remote provisioning request being carried out using the parameter for remote provisioning, the cellular network is configured to:
forward the remote provisioning request to the remote provisioning server via the remote provisioning network slice, and
respond via said base node to the user equipment with a provisioning dataset received from the remote provisioning server, in case a user equipment identifier stored in the remote provisioning server is matching the initial device identifier.

7. The system according to claim 6,
wherein the remote provisioning network slice comprises a network node that is shared between said cellular network and at least one other cellular network,
and the remote provisioning server is accessible for both cellular networks via said network node.

8. The system according to claim 6,
wherein the access from the remote provisioning network slice to entities outside of the remote provisioning network slice is restricted to the remote provisioning server.

9. The system according to claim 6,
wherein the base node is configured to access the remote provisioning network slice for provisioning user equipment, and to operate user equipment requesting access with an initial device identifier, and
wherein the base node is further configured to broadcast an information element,
said information element comprising an indication about whether the base node is capable of supporting remote provisioning.

10. The system according to claim 6,
wherein the cellular network comprises a second base node configured to broadcast an information element comprising an indication indicating to the base node capable of supporting remote provisioning, in case said second base node is not capable of supporting remote provisioning.

11. The system according to claim 9,
wherein the information element is part of a system information element, wherein the system information element is dedicated to user equipment requesting for authentication credentials.

12. The system according to claim 11,
wherein the base node is further configured to broadcast with system information block a provisioning barring indication, indicating that user equipment requesting for a remote provisioning request are barred from accessing the cellular network.

13. The system according to claim 9,
wherein the base node is further configured to provide dedicated random access channel (RACH) resources for receiving a remote provisioning request and to indicate with the broadcasted information elements said RACH resources.

14. The system according to claim 6, further comprising:
the user equipment for operating in a cellular network, comprising a memory, where an initial device identifier is stored, said initial device identifier being different from authentication credentials for unrestricted access to base nodes of the cellular network, the user equipment further comprising a secure memory element for storing authentication credentials,
the user equipment is configured to:
  receive at least one broadcasted information element from the base node of the cellular network,
  in case said information element indicates the capability of supporting remote provisioning, attach to said base node and send a remote provisioning request comprising said initial device identifier,
  upon reception of a provisioning dataset from the base node, install in said secure memory authentication credentials derived from said provisioning dataset.

15. The system according to claim 14,
wherein the user equipment is further configured, in case said received information element indicates a second base node capable of supporting remote provisioning, to attach to said second base node.

16. The system according to claim 14,
wherein the user equipment is further configured, in case said received information element indicates the non-availability of remote provisioning capability, to blacklist said cellular network for remote provisioning and to search for a base node of another cellular network.

17. The system according to claim 14,
wherein the user equipment is further configured to terminate the attachment after successfully installing authentication credentials, and
to attach to a different base node of the cellular network being assigned to a network slice different from the remote provisioning network slice using said authentication credentials.

18. The method according to claim 1, wherein each network slice comprises a different group of network nodes with one or more network nodes being mutually exclusive of other network slices.

19. The system according to claim 6, wherein each network slice comprises a different group of network nodes with one or more network nodes being mutually exclusive of other network slices.

* * * * *